(12) United States Patent
Hatano et al.

(10) Patent No.: US 7,113,889 B2
(45) Date of Patent: Sep. 26, 2006

(54) DATA ANALYZING APPARATUS, DATA ANALYZING PROGRAM, AND MOBILE TERMINAL

(75) Inventors: Hisaaki Hatano, Kanagawa-Ken (JP); Akihiko Nakase, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/860,037

(22) Filed: Jun. 4, 2004

(65) Prior Publication Data

US 2004/0267455 A1    Dec. 30, 2004

(30) Foreign Application Priority Data

Jun. 30, 2003   (JP)   ............................ 2003-188433
Dec. 25, 2003   (JP)   ............................ 2003-429736

(51) Int. Cl.
*G06F 19/00*    (2006.01)
(52) U.S. Cl. .................................................... 702/183
(58) Field of Classification Search ................ 702/183, 702/143; 715/700; 701/117, 118, 53; 705/10; 709/223, 217; 719/310; 455/430; 700/242; 340/443; 703/137
See application file for complete search history.

(56) References Cited

U.S. PATENT DOCUMENTS

2002/0065599 A1 *   5/2002   Hameleers et al. .......... 701/117

2003/0069683 A1 *   4/2003   Lapidot et al. ............. 701/117

FOREIGN PATENT DOCUMENTS

| JP | 2000-321081 | 11/2000 |
| JP | 3276945 | 2/2002 |
| JP | 3370555 | 11/2002 |

* cited by examiner

*Primary Examiner*—Michael Nghiem
*Assistant Examiner*—Tung S. Lau
(74) *Attorney, Agent, or Firm*—Oblon, Spivak, McClelland, Maier & Neustadt, P.C.

(57) ABSTRACT

A data analyzing apparatus that stores geographic information and observation data including various information regarding an event. A data processing unit generates analyzing data by using the geographic information and the observation data, and a data analyzing unit derives a tendency of occurrence of the event based on the analyzing data. A prediction unit predicts a place where the tendency of occurrence of the event is high by using the tendency and the geographic information. An observation data input unit inputs new observation data, and an analyzing monitor unit controls the data processing unit to generate modified analyzing data by using the new observation data, the observation data and the geographic information, and readjusts the analyzed result based on the modified analyzing data. A health condition observer observes a health condition data, and the observation data input unit inputs the observation data including the health condition data.

2 Claims, 15 Drawing Sheets

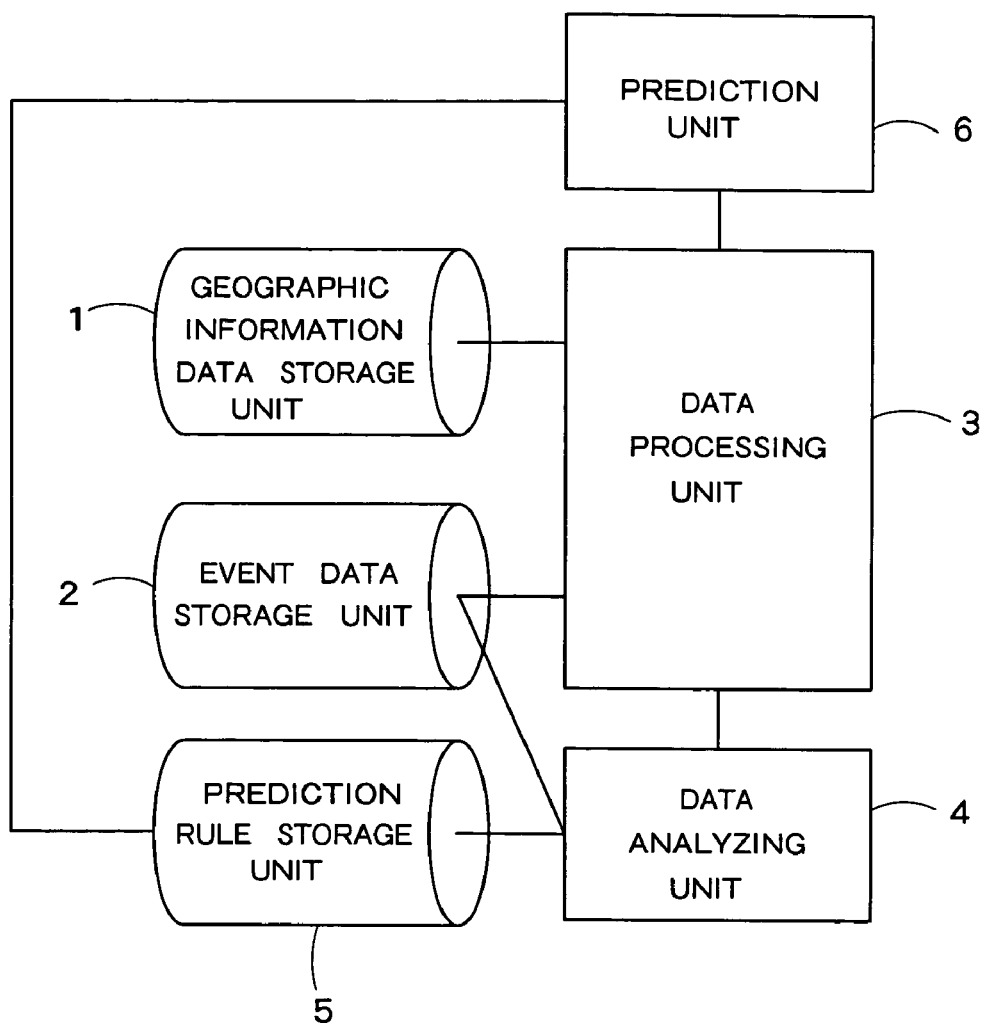
F I G. 1
| DATE | COORDINATES | EVENT |
|---|---|---|
| 7/1 20:00 | (200,100) | SUDDEN BRAKING |
| 7/2 21:30 | (100,200) | SUDDEN BRAKING |
| 7/4 20:00 | (300,170) | HORN |
| 7/4 21:15 | (200,180) | SUDDEN BRAKING |
| 7/5 19:00 | (200,300) | SUDDEN BRAKING |
F I G. 2

| DATE | COORDINATES | EVENT |
|---|---|---|
| 7/1 20:00 | (200,100) | SUDDEN BRAKING |
| 7/1 20:01 | (200,110) | ORDINARY STATE |
| 7/1 20:02 | (200,120) | ORDINARY STATE |
| 7/1 20:03 | (200,130) | ORDINARY STATE |
| 7/1 20:04 | (200,140) | ORDINARY STATE |
| 7/1 20:05 | (200,150) | ORDINARY STATE |
| 7/1 20:06 | (200,160) | ORDINARY STATE |
| 7/1 20:07 | (200,170) | ORDINARY STATE |
| 7/1 20:08 | (200,180) | SUDDEN BRAKING |
| 7/1 20:09 | (200,190) | ORDINARY STATE |
| 7/1 20:10 | (200,200) | ORDINARY STATE |
| 7/1 20:11 | (200,210) | ORDINARY STATE |
| 7/1 20:12 | (200,220) | ORDINARY STATE |

FIG. 3

| DATE | COORDINATES | EVENT |
|---|---|---|
| 7/1 20:00 | (200,100) | SUDDEN BRAKING |
| 7/2 21:30 | (100,200) | SUDDEN BRAKING |
| 7/4 20:00 | (300,170) | HORN |
| 7/4 21:15 | (200,180) | SUDDEN BRAKING |
| 7/5 19:00 | (200,300) | SUDDEN BRAKING |
| 7/6 13:10 | (200,180) | ORDINARY STATE |
| 7/7 14:00 | (200,300) | ORDINARY STATE |

FIG. 4

| DATE | COORDINATES | EVENT | TIME ZONE | WEATHER |
|---|---|---|---|---|
| 7/1 20:00 | (200,100) | SUDDEN BRAKING | NIGHTTIME | RAIN |
| 7/2 21:30 | (100,200) | SUDDEN BRAKING | NIGHTTIME | FINE |
| 7/4 20:00 | (300,170) | HORN | NIGHTTIME | FINE |
| 7/4 21:15 | (200,180) | SUDDEN BRAKING | NIGHTTIME | FINE |
| 7/5 19:00 | (200,300) | SUDDEN BRAKING | NIGHTTIME | RAIN |
| 7/6 13:10 | (200,180) | ORDINARY STATE | DAYTIME | FINE |
| 7/7 14:00 | (200,300) | ORDINARY STATE | DAYTIME | RAIN |

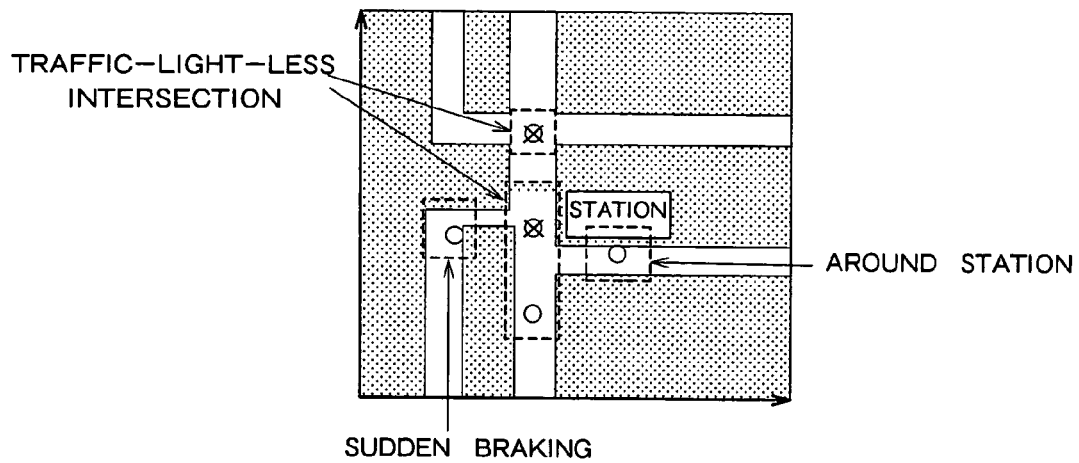
F I G. 7
```
NIGHTTIME & TRAFFIC-LIGHT-LESS INTERSECTION → DANGER
SUDDEN BRAKING        →    DENGER
AROUND STATION        →    DENGER
```
F I G. 8
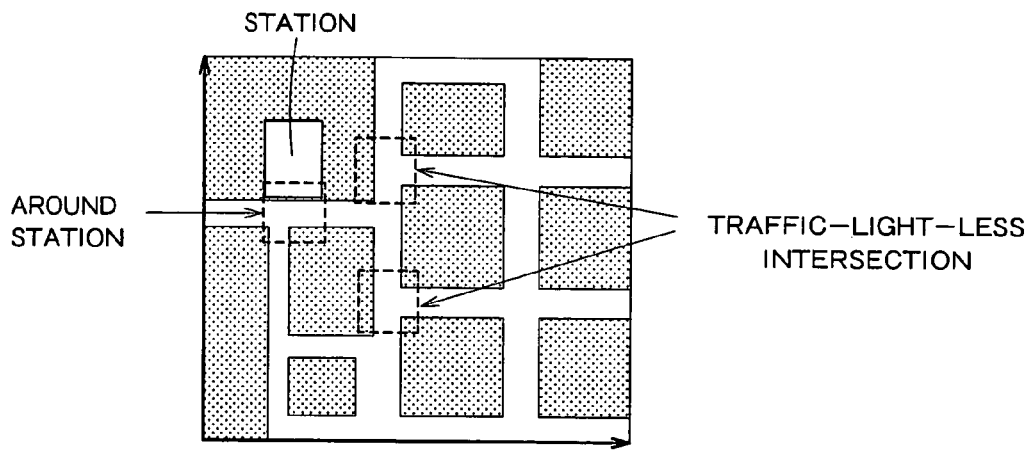
F I G. 9

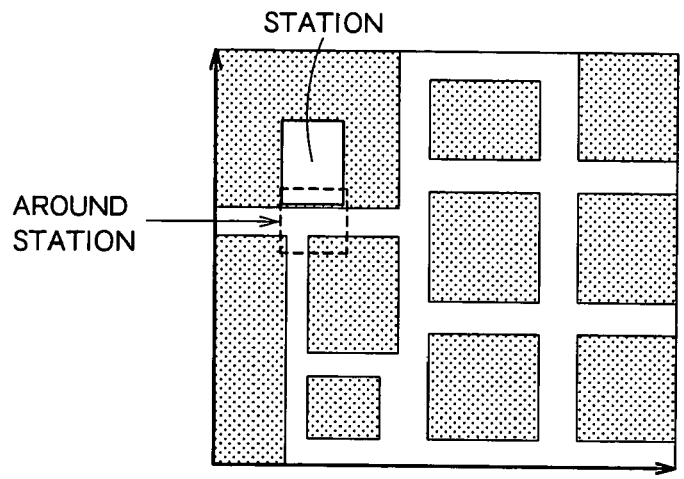
F I G. 10
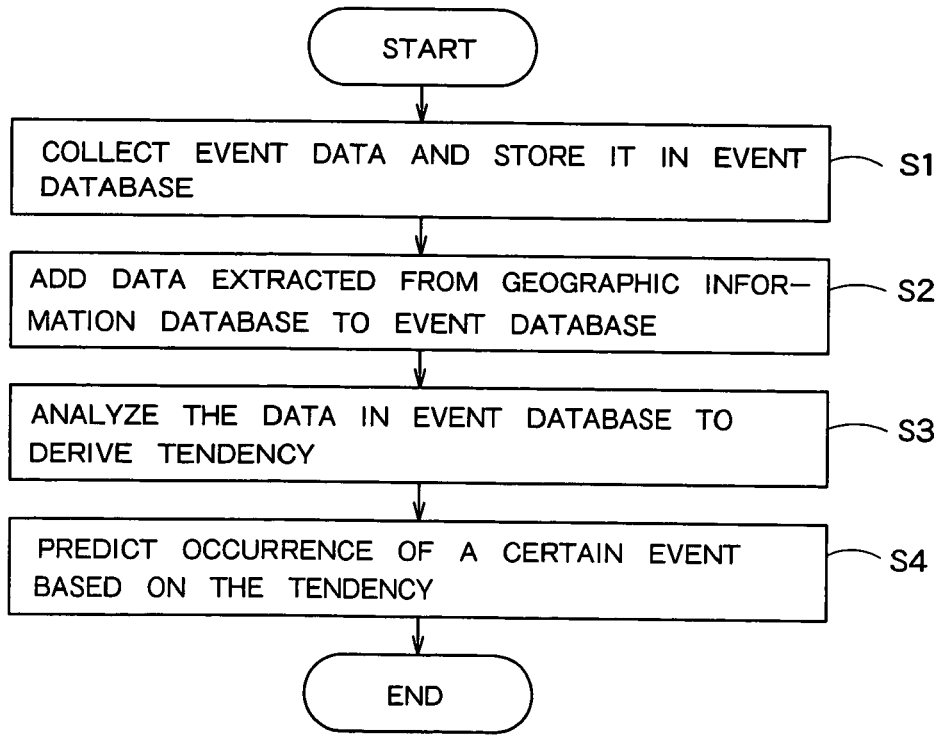
F I G. 11

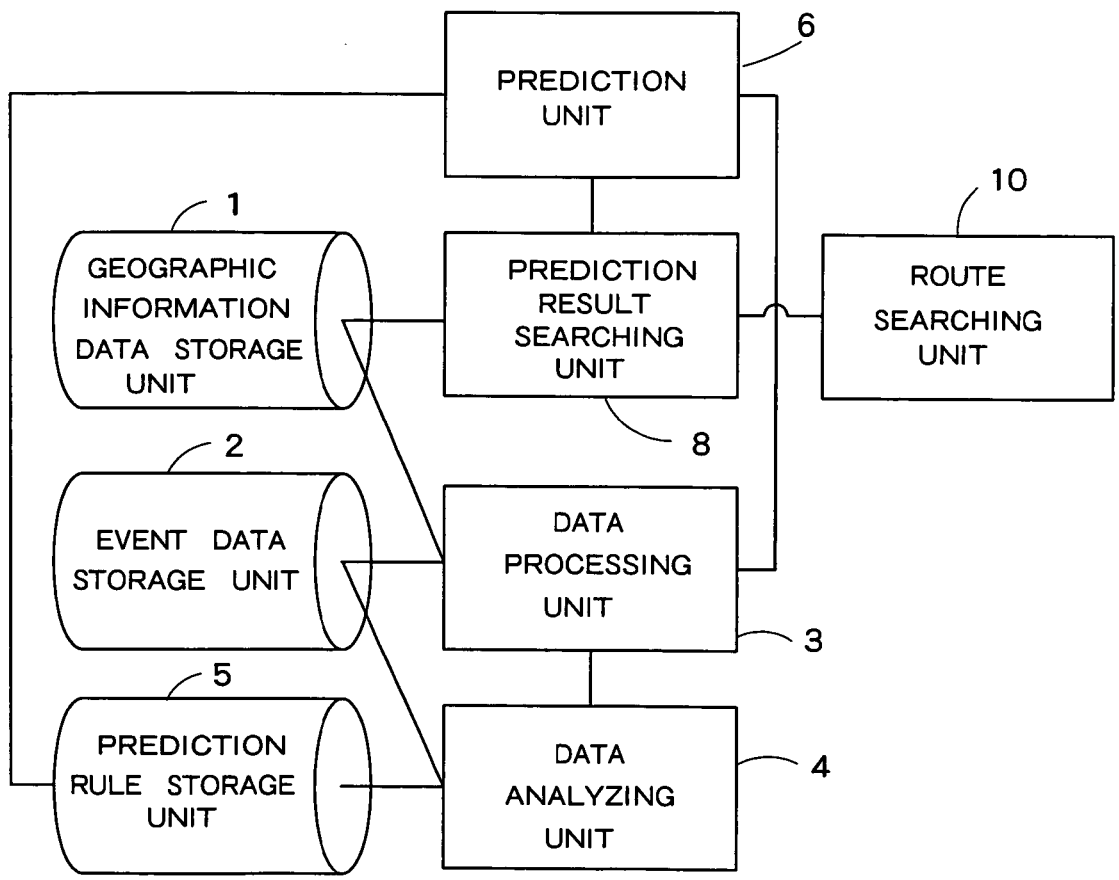
F I G. 14

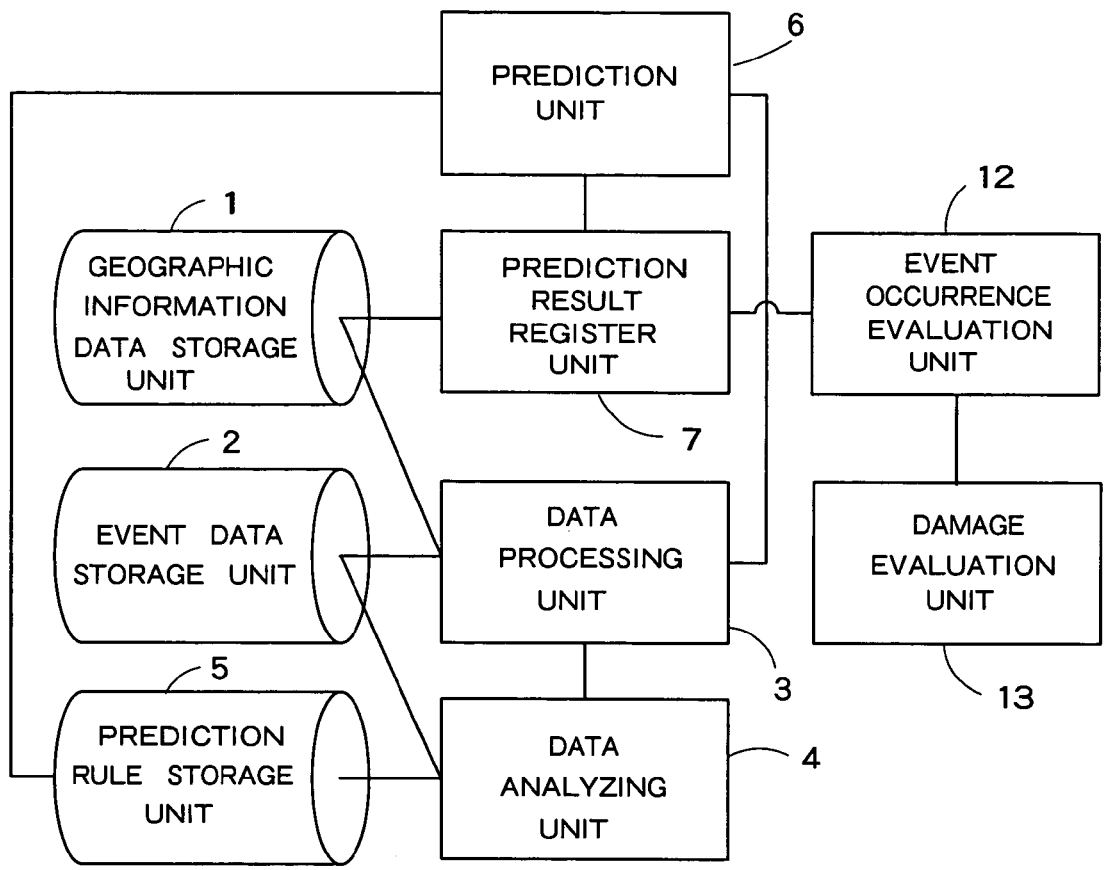
F I G. 18

| DATE | COORDINATES | EVENT | TIME ZONE | WEATHER | AROUND STATION | AROUND TRAFFIC-LIGHT-LESS INTERSECTION | AROUND SUDDEN CURB |
|---|---|---|---|---|---|---|---|
| 7/1 20:00 | (200,100) | SUDDEN BRAKING | NIGHTTIME | RAIN | X | O | X |
| 7/2 21:30 | (100,200) | SUDDEN BRAKING | NIGHTTIME | FINE | X | X | O |
| 7/4 20:00 | (300,170) | HORN | NIGHTTIME | FINE | O | O | X |
| 7/4 21:15 | (200,300) | SUDDEN BRAKING | NIGHTTIME | FINE | O | X | X |
| 7/5 19:00 | (200,300) | SUDDEN BRAKING | NIGHTTIME | RAIN | X | O | X |
| 7/6 13:10 | (200,180) | ORDINARY STATE | DAYTIME | FINE | X | O | X |
| 7/7 14:00 | (200,300) | ORDINARY STATE | DAYTIME | RAIN | X | O | X |

F I G. 23

DATA ANALYZING APPARATUS, DATA ANALYZING PROGRAM, AND MOBILE TERMINAL

CROSS REFERENCE TO RELATED APPLICATIONS

This application claims benefit of priority under 35 USC §119 to Japanese Patent Applications No. 2003-188433 filed on June 30 and No. 2003-429736 filed on Dec. 25, 2003, the entire contents of which are incorporated by reference herein.

BACKGROUND OF THE INVENTION

1. Field of the Invention

The present invention relates to a data analyzing apparatus, a data analyzing method, and a data analyzing program which analyze an event on the basis of geographic information.

2. Background Art

A geographic information system (GIS) which can display various pieces of information such as topographic information or which can perform route searching between arbitrarily given points is known. A global positioning system (GPS) which can extract coordinates at which a certain object is currently positioned is also known. A combination of the GIS and the GPS can detect a specific point at which the object is currently present at the point on a map, and can be applied to an automobile navigation system or searching for a nearest object.

Information registered in the GIS include information of immovable objects such as topographic features, roads, and buildings, objective data such as precipitation, tolls of toll roads, and population density.

For example, when a start point and an end point are given to an automobile to perform route searching between the two points, re-searching for a route is performed such that static data such as the presence/absence of roads, objective data such as tolls of toll roads, and time-series traffic jam information are reflected. For this reason, a route with the minimum toll and a route for the earliest arrival time can be established.

An automatic process (see Japanese Patent Laid-open No. 321081/2000) of a traveling route by topographic features, a data processing device (see Japanese Patent No. 3276945) which detects the traveling route based on a positioning data acquiring means such as a PHS, a device obtained by modifying the data processing device to be used for pedestrians (see Japanese Patent No. 3370555), and the like are proposed.

However, a conventional system which performs searching in a subjective condition such as, for example, "route on which a beginning driver can safely drives" or a condition in which an objectively determined reference is not clear has not existed.

For example, past traffic accident cases are given to geographic information, and route searching can be performed so as to avoid an accident occurrence location. However, there is no guarantee that a location where an accident has not yet occurred is not necessarily safe also in the future. This is because a "location where an accident has previously occurred" is known, but a "location where an accident is likely to occur" is not known.

When a traffic accident occurs, the traffic accident is recorded as a traffic record. However, a "case in which a traffic accident was about to occur" is not recorded as a record. For safety purposes, such a case in which an accident was about to occur must be handled equally as a case in which an accident has actually occurred. However, this is impossible in a current geographic information system.

SUMMARY OF THE INVENTION

The present invention has been made in consideration of the above points, and has as its object to provide a data analyzing apparatus, a data analyzing method, and the data analyzing program which can easily and accurately predict a tendency of occurrence of an event.

A data analyzing apparatus according to an embodiment of the present invention, comprising:
a first storage which stores geographic information;
a second storage which stores observation data including contents of an event, a position where the event occurred and a time when the event occurred;
a data processing unit configured to generate analyzing data by using the geographic information and the observation data;
a data analyzing unit configured to derive a tendency of occurrence of the event based on the analyzing data; and
a prediction unit configured to predict a place where the tendency of occurrence of the event is high by using the tendency and the geographic information.

Furthermore, a program according to one embodiment of the present invention which allows a computer to analyze data, comprising:
generating analyzing data by using observation data including contents of an event, a position where the event occurred and a time when the event occurred, and geographic information;
deriving a tendency of occurrence of the event based on the analyzing data; and
predicting a place where the tendency of occurrence of the event is high by using the tendency and the geographic information.

Furthermore, a portable terminal according to one embodiment of the present invention, comprising:
a communication unit configured to communicate with a data analyzing apparatus having a first storage which stores geographic information; a second storage which stores observation data including contents of an event, a position where the event occurred and a time when the event occurred; a data processing unit configured to generate analyzing data by using the geographic information and the observation data; a data analyzing unit configured to derive a tendency of occurrence of the event; and a prediction unit configured to predict a place where the tendency of occurrence of the event is high by using the tendency and the geographic information;
a receiver which receives information relating to the predicted place;
a current position specifying unit configured to specify a current position; and
a warning unit configured to give a warning when the current position approached the predicted place.

BRIEF DESCRIPTION OF THE DRAWINGS

FIG. 1 is a block diagram showing a schematic configuration of the second embodiment of a data analysis apparatus according to the present invention.

FIG. 2 is a diagram showing the storage contents of the event data storage unit 2.

FIG. 3 is a diagram showing a modified example of contents stored in event data storage unit.

FIG. 4 is a diagram showing a modified example of contents stored in event data storage unit.

FIG. 7 is a plot view adding geographic information to FIG. 6.

FIG. 8 is a diagram showing tendency of occurrence of event formed by data analyzing unit.

FIG. 9 is a diagram showing an occurrence prediction location of a nighttime dangerous event predicted by using the tendency in FIG. 8.

FIG. 10 is a diagram showing an occurrence prediction location of a daytime dangerous event.

FIG. 11 is a flow chart showing a procedure of the first embodiment of a data analyzing apparatus according to the present invention.

FIG. 14 is a block diagram of data analyzing apparatus having route searching unit 10.

FIG. 18 is a block diagram showing schematic configuration according to third embodiment of data analyzing apparatus of the present invention.

FIG. 23 is a diagram showing one example of analyzing data.

DETAILED DESCRIPTION OF THE INVENTION

A data analyzing apparatus, a data analyzing method, and a data analyzing program according to the present invention will be described below with reference to drawings.

(First Embodiment)

The first embodiment is to drive an automobile comprising sudden braking detection device and a position acquiring device to predict occurrence of a dangerous event such as sudden braking, sounding of horn of oncoming vehicle, or the like.

Figure 12:
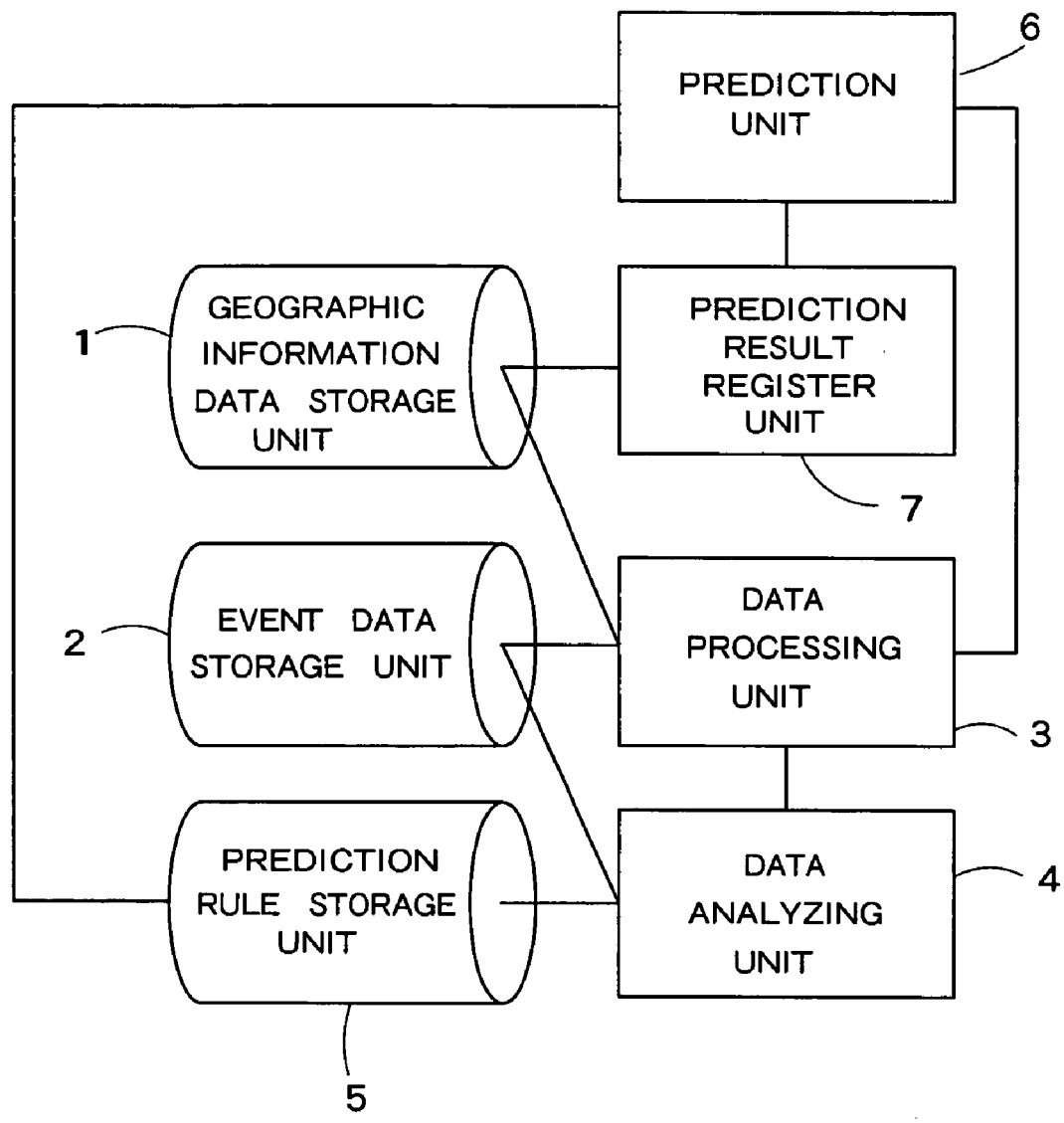
FIG. 12 is a block diagram of data analyzing apparatus having prediction result register unit 7.

FIG. 12 is a block diagram showing a schematic configuration of an embodiment of a data analyzing apparatus according to the present invention. The data analyzing apparatus in FIG. 12 comprises at least a geographic information data storage unit 1 which stores geographic information, an event data storage unit 2 which stores observation data including event information related to a specific event occurring at a specific position included in the geographic information stored in the geographic information data storage unit 1, position information about where the event has occurred, and time information about when the event has occurred, a data processing unit 3 which adds attribute information representing predetermined characteristics stored in the geographic information data storage unit 1 and a degree corresponding to the attribute information to the observation data to generate analysis data, a data analyzing unit 4 which derives a tendency of occurrence of a predetermined event on the basis of the analysis data, a prediction rule storage unit 5 which registers prediction rules formed by analyzing data in the event data storage unit 2, and a prediction unit 6 which predicts a tendency at an arbitrary location by using the prediction rule.

FIG. 2 is a diagram showing the storage contents of the event data storage unit 2. As shown in FIG. 2, the event data storage unit 2 stores a data representing time at which an event has occurred, coordinates representing a location where an event has occurred, and the concrete contents of the event in the form of a table. The location where the event has occurred is detected by the global positioning system (GPS) mounted on the automobile, and occurrence of sudden braking can be detected by installing, for example, an acceleration detector in the automobile. The time may be obtained by using a clock provided in the automobile or by installing a time measuring means such as a radio clock.

A sound recognition device which inputs that a horn is sounded at a driver as the audio when an oncoming vehicle uses a horn at the driver can be easily mounted by using a sound input technique of a current car navigation system.

Not only a method of collecting only a case in which a dangerous event occurs as shown in FIG. 2, but also a method of recording an event which is not dangerous at predetermined intervals as shown in FIG. 3 may be used. Also, as shown in FIG. 4, when a dangerous event occurs and when a driver passes through a position (coordinates) where a dangerous event has previously occurred in the past, the events may be recorded.

Figures 5, 6:
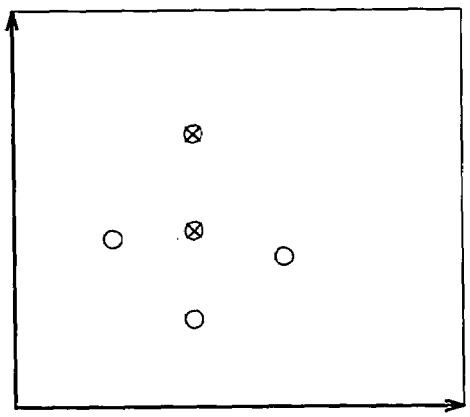
FIG. 5 is a diagram showing a modified example of contents stored in event data storage unit.
FIG. 6 is a diagram obtained by plotting event information on a two-dimensional plane.

By knowing time and a location, it is possible to know sunset time and weather. For this reason, as shown in FIG. 5, information related to a time zone (nighttime or daytime) in which an event has occurred and weather (fine or rain) can be added to the information in FIG. 4. Tables in FIGS. 2 to 5 are formed by the data processing unit 3.

FIG. 6 is a diagram obtained by plotting event information on a two-dimensional plane. In FIG. 6, a circle represents a dangerous event, i.e., occurrence of sudden braking or a sounding of horn, a mark x represents an event which is not dangerous. In some location, both a dangerous event and a not-dangerous event happened. A tendency of occurrence of an event cannot be easily known by only FIG. 6.

Therefore, in this embodiment, as shown in FIG. 7, geographic information is added to FIG. 6. Character information "around a station", "sharp curve", and a "traffic-light-less intersection" described at the ends of arrows in FIG. 7 are results obtained by searching the geographic information by using coordinates representing locations where events have occurred. Analysis data shown in FIG. 23 is obtained by adding a searching result to FIG. 5. A region surrounded by a dotted line in FIG. 7 is a region which is determined as a region having characteristics on the basis of the geographic information.

As a data analyzing method which derives a spatial tendency of a large number of pieces of information in a database, a spatial data mining method is applied to FIG. 7, so that tendencies at locations where events have occurred can be obtained. As it is apparent from FIG. 7, dangerous events such as sudden braking or a sounding of horn of oncoming vehicle are likely to occur at a traffic-light-less intersection at night or a sharp curve or around a station.

FIG. 8 is a diagram showing a tendency of occurrence of events formed by the data analyzing unit 4. The tendency shown in FIG. 8 is applied to a region which is stored in the geographic information data storage unit 1 and which is different from that in FIG. 7, so that a zone where a dangerous event is likely to occur can be predicted even though an event is not actually recorded.

For example, FIG. 9 is a diagram showing an occurrence prediction location of a nighttime dangerous event predicted by using the tendency in FIG. 8. FIG. 10 is a diagram showing an occurrence prediction location of a daytime dangerous event. In these drawings, the occurrence prediction location of a dangerous event is surrounded by a dotted line.

As shown in FIGS. 9 and 10, when a map added with the occurrence prediction information of a dangerous event is formed, a degree of danger can be evaluated for each traveling route. The degree of danger, as will be described below, for example, can be used in route searching.

FIG. 11 is a flow chart showing a procedure of the first embodiment of a data analyzing apparatus according to the present invention. Event data (for example, a positional relationship between events and coordinate positions shown in FIGS. 2 and 5) related to an event to be analyzed/predicted (for example, the above described sudden braking or the sounding of horn of an oncoming vehicle) is collected and stored in the event data storage unit 2 (step S1).

Information (for example, geographic information around a coordinate position where an event has occurred) extracted from the geographic information data storage unit 1 is added to the event data storage unit 2 (step S2).

The collected events are analyzed to generate tendency (step S3). On the basis of the tendency, occurrence of a given event is predicted (step S4).

In this manner, in the first embodiment, the type of an event, an occurrence location of the event, and occurrence time of the event are analyzed to generate tendencies , and occurrence of the event is predicted on the basis of the tendency A time zone and a location in/at which the probability of occurrence of the event is high can be accurately predicted. Therefore, when route searching of a movable body is performed, an optimum route which reliably avoids a dangerous event can be easily detected.

(Second Embodiment)

The second embodiment is a modification of the first embodiment. In the second embodiment, collected events are analyzed to form a prediction rule.

Figure 13:
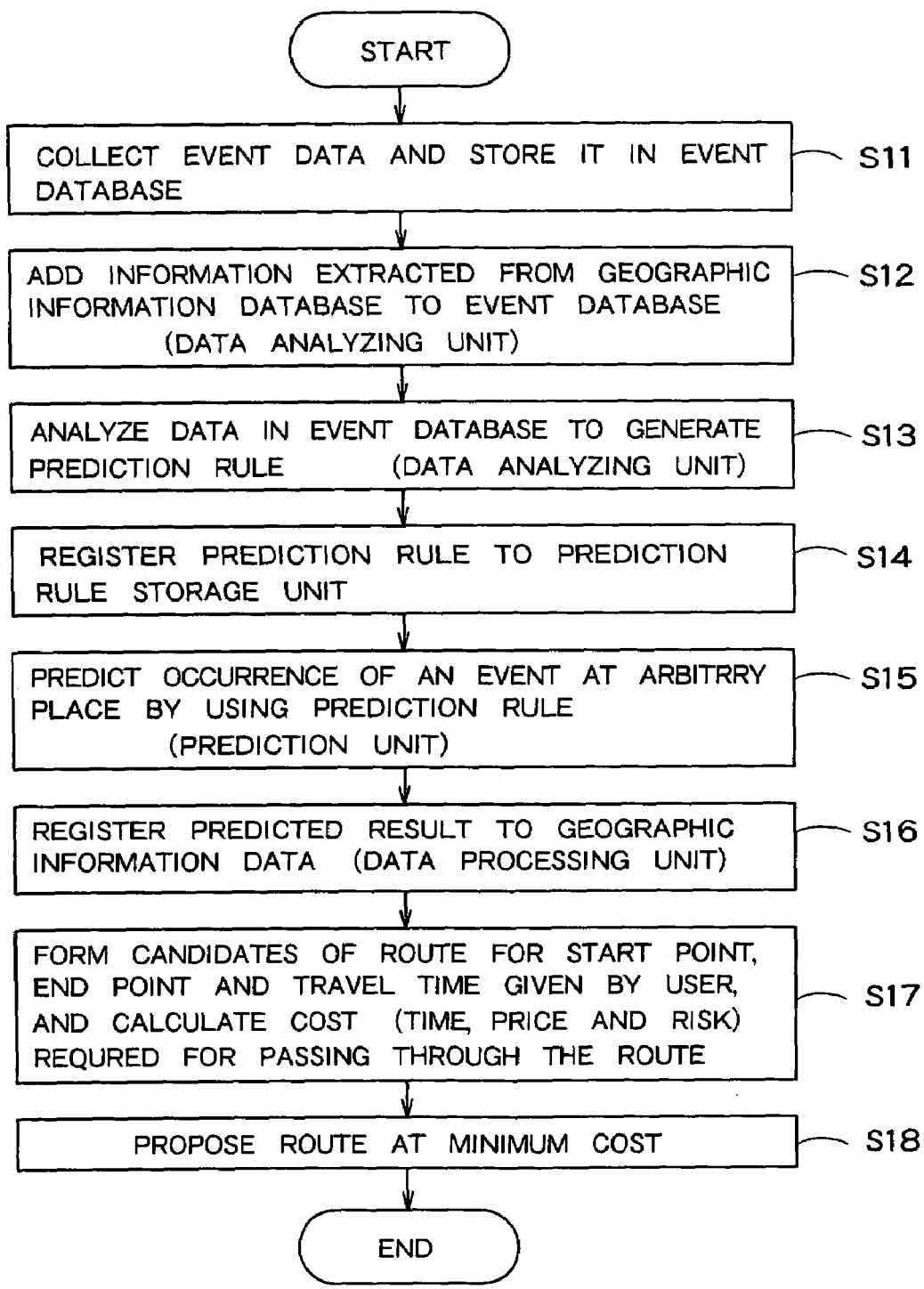
FIG. 13 is a flow chart showing an example of a procedure of the data analyzing apparatus in FIG. 1.

FIG. 12 is a block diagram showing a schematic configuration of the second embodiment of a data analysis apparatus according to the present invention. The data analyzing apparatus in FIG. 12 comprises, in addition to the configuration in FIG. 1, a prediction register unit 7 which registers predictions generated by the prediction unit 6 to the geographic information data storage unit 1. FIG. 13 is a flow chart showing an example of a procedure of the data analyzing apparatus in FIG. 12. Steps S11 and S12 are the same as steps S1 and S2 in FIG. 11. After the process in step S2 is ended, the data analyzing unit 4 analyzes data in the event data storage unit 3 to form a prediction rule (step S13), and the prediction rule is registered in the prediction rule storage unit 5 (step S14).

The prediction unit 6 predicts a occurrence of an event at an arbitrary location by using the prediction rule (step S15), and the prediction register unit 7 stores the prediction result in the geographic information data storage unit 1 (step S16).

As the geographic information data in which prediction result is recoded, a new usage may be adopted. For example, as the prediction result, when dangerous state predicted in driving is added to the geographic information data, the geographic information data can be used for route searching with less risk. FIG. 14 is a block diagram used for the route searching. FIG. 14 has a configuration to which a prediction result searching unit 8 and route searching unit 10 are added.

The data analyzing unit 4 forms candidates of the optimum route on the basis of a start point, an end point, and traveling time given by a user, and calculates costs (time, expense, risk, and the like) required for passing through the routes. A route having the minimum cost is shown (step S17).

Figure 15:
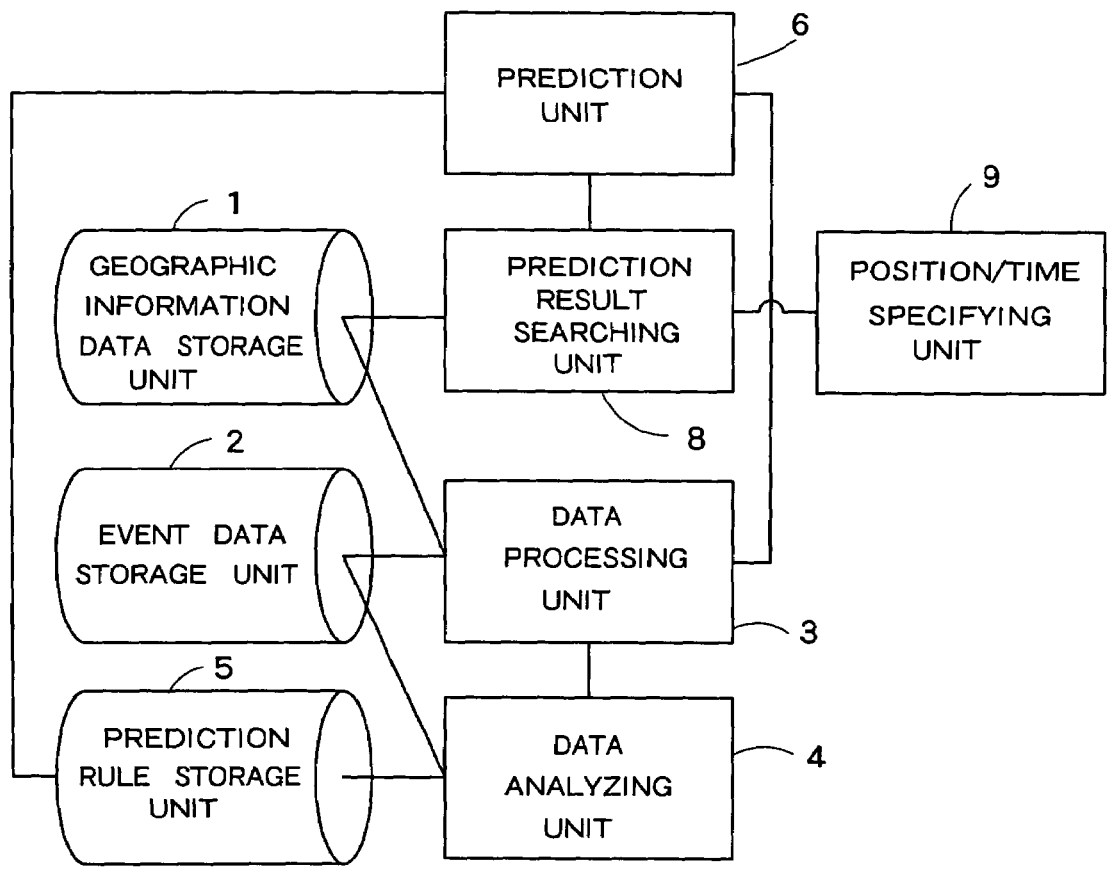
FIG. 15 is a block diagram of data analyzing apparatus which searches tendency from prediction result searching unit 8 by setting position and time at which movable body moves currently as a key.

Furthermore, as shown in FIG. 15, a position/time specifying unit 9 which detects a position and time at which a movable body currently travels is arranged, and a tendency is searched by a prediction result searching unit 8 such that the position and the time are used as keys. The prediction result searching unit 8 searches for the tendency at a specific position on the basis of the geographic information, position information, time information, and the like stored in the geographic information data storage unit 1.

As shown in FIG. 14, a route searching means 10 which searches for an optimum route in which an evaluation amount including risk searched by the prediction result searching unit 8 when a travel start position and a travel end position of a movable body are given may be arranged.

Figure 16:
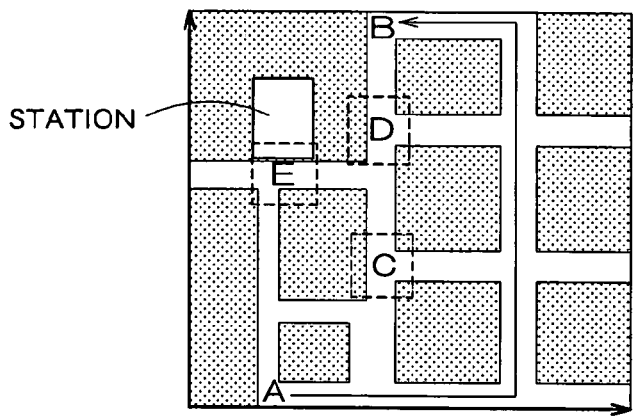
FIG. 16 is a diagram showing an example in which nighttime route searching extending from point A to point B is performed.

For example, FIG. 16 is a diagram showing an example in which nighttime route searching extending from point A to point B is performed. Dotted lines C, D, and E in FIG. 16 indicate locations which are determined to be dangerous by the tendency prediction unit 6. In general route searching, an optimum route for traveling time or a toll is selected. However, a route having the minimum probability of occurrence of an accident can be found by using occurrence prediction information of a dangerous event formed in this embodiment.

The example in FIG. 16 shows that a route is formed while avoiding a traffic-light-less intersection and points C, D, and E corresponding to the area around a station. A route may be formed in consideration of a case in which a traveling route in a time zone around the sunset is formed or a case in which it becomes night while traveling.

Figure 17:
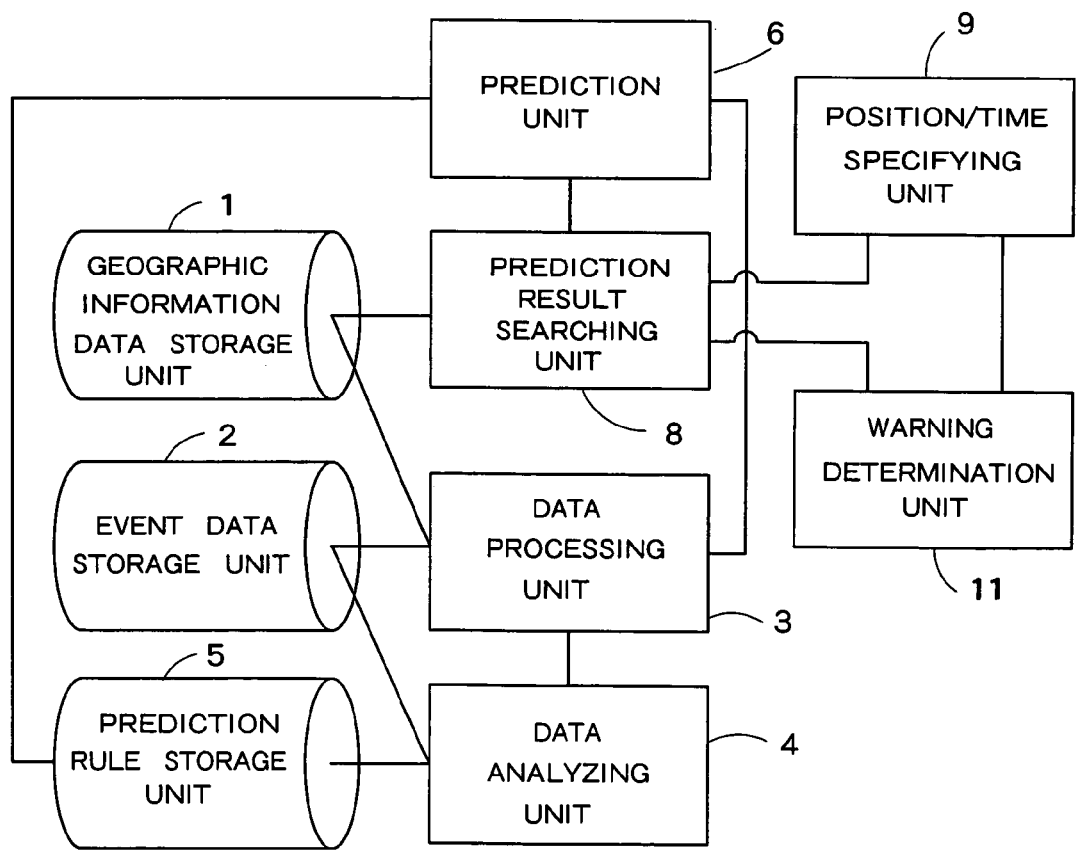
FIG. 17 is a block diagram of data analyzing apparatus having warning determination unit.

As shown in FIG. 17, there may be provided with a warning determination unit 11 which gives warning to a driver when the driver comes close to a "highly dangerous point" searched by the prediction result searching unit 8. The warning determination unit 11 determines that a driver is close to the "highly dangerous point" when a distance between, for example, a "highly dangerous point" and a current position is a certain threshold value or less, and gives warning to the driver.

Also, as shown in FIG. 18, there may be provided with an event occurrence evaluation unit 12 which calculate a probability of occurrence of an event by using geographic information data recorded in the geographic information data storage unit 1 by the prediction result registration unit 7 and geographic information data corresponding to a route on a map arbitrarily given, and a damage evaluation unit 13 which calculates an expectation value of damage on the basis of the probability and damage suffered in occurrence of a given event.

In this manner, in the second embodiment, since a tendency at an arbitrary location is predicted by using the tendency prediction rule, a tendency at any location can be easily and accurately detected.

(Third Embodiment)

In the third embodiment, after a tendency is temporarily derived, the tendency is readjusted. The tendency is expressed by, for example, a plurality of if-then rules. The tendency is readjusted to reconfirm the credibility of the if-then rules. For example, FIG. 8 shows three if-then rules.

When a driver travels on the vehicle at time and a point at which occurrence of a dangerous event is predicted, on the basis of the if-then rules in FIG. 8, the number of times of occurrence of an event of three if-then rules is calculated. An if-then rule having a small number of times which is measured is deleted, and predicted information of occurrence of danger is updated. In this manner, the latest evaluation value of risk can be maintained.

When a new dangerous event is added, tendency performed by spatial data mining may be performed again, and the if-then rules may be reconstructed.

When a driver travels on the vehicle at time and a point at which occurrence of a dangerous event is predicted, the traveling is permitted to readjust the if-then rules for predicting the dangerous event, and the occurrence of the event must be confirmed. Such a tendency readjustment mode and an operation mode which actively notifies the driver of oncoming of danger with warning are switched as needed, so that a safety drive navigation which safely navigates the movable body while readjusting the if-then rules can be realized.

Figure 19:
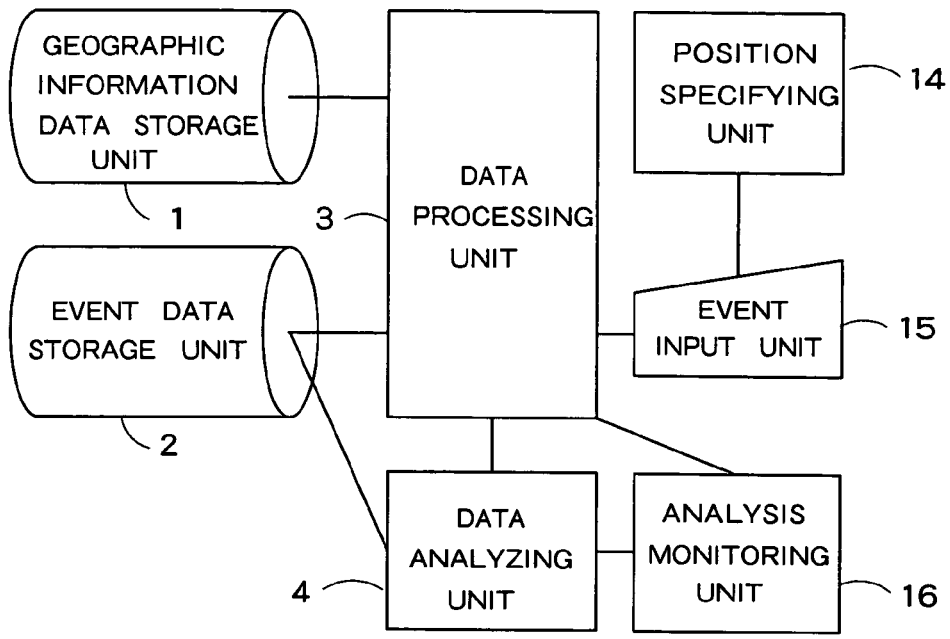
FIG. 19 is a block diagram showing schematic configuration according to third embodiment of data analyzing apparatus of the present invention.

FIG. 19 is a block diagram showing a schematic configuration of the third embodiment of a data analyzing apparatus according to the present invention. The data analyzing apparatus in FIG. 19 comprises, in addition to the configuration in FIG. 1, a position specifying unit 14 which specifies a current position, an event input unit 15 which accepts an input of an event, and an analysis monitoring unit 16 which monitors whether readjustment of a tendency is performed or not.

When an event is related to a driving operation of an automobile, for example, the event input to the event input unit 15 is occurrence time, an occurrence location of the event, or the like. Flashing headlights of an oncoming vehicle, a sounding of horn from an automobile closely running, a warning from an obstruction detection device, and the like may be input as events.

Dangerous driving operations such as sudden braking, sudden swerving, and the like may be input as events, or sound such as a voice uttered by a driver may be input as an event.

Figure 20:
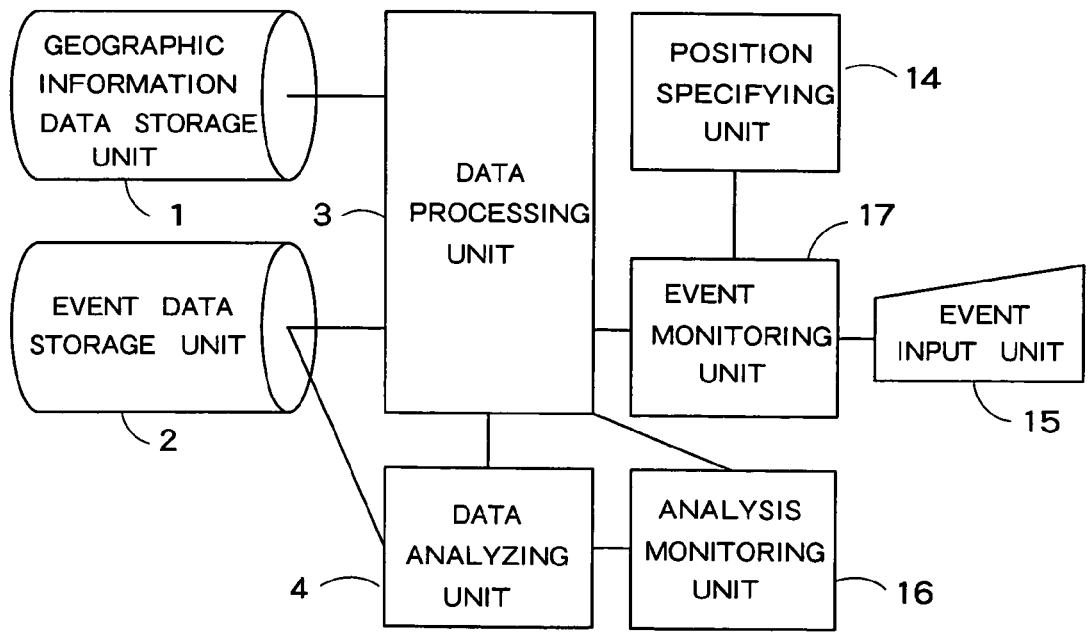
FIG. 20 is a block diagram showing schematic configuration of data analyzing apparatus adding event monitoring unit to FIG. 19.

The dangerous operations of the automobile such as sudden braking and sudden swerving can be automatically detected. For this reason, as shown in FIG. 20, an even monitoring unit 17 may be arranged to automatically detect a dangerous driving operation.

Figure 21:
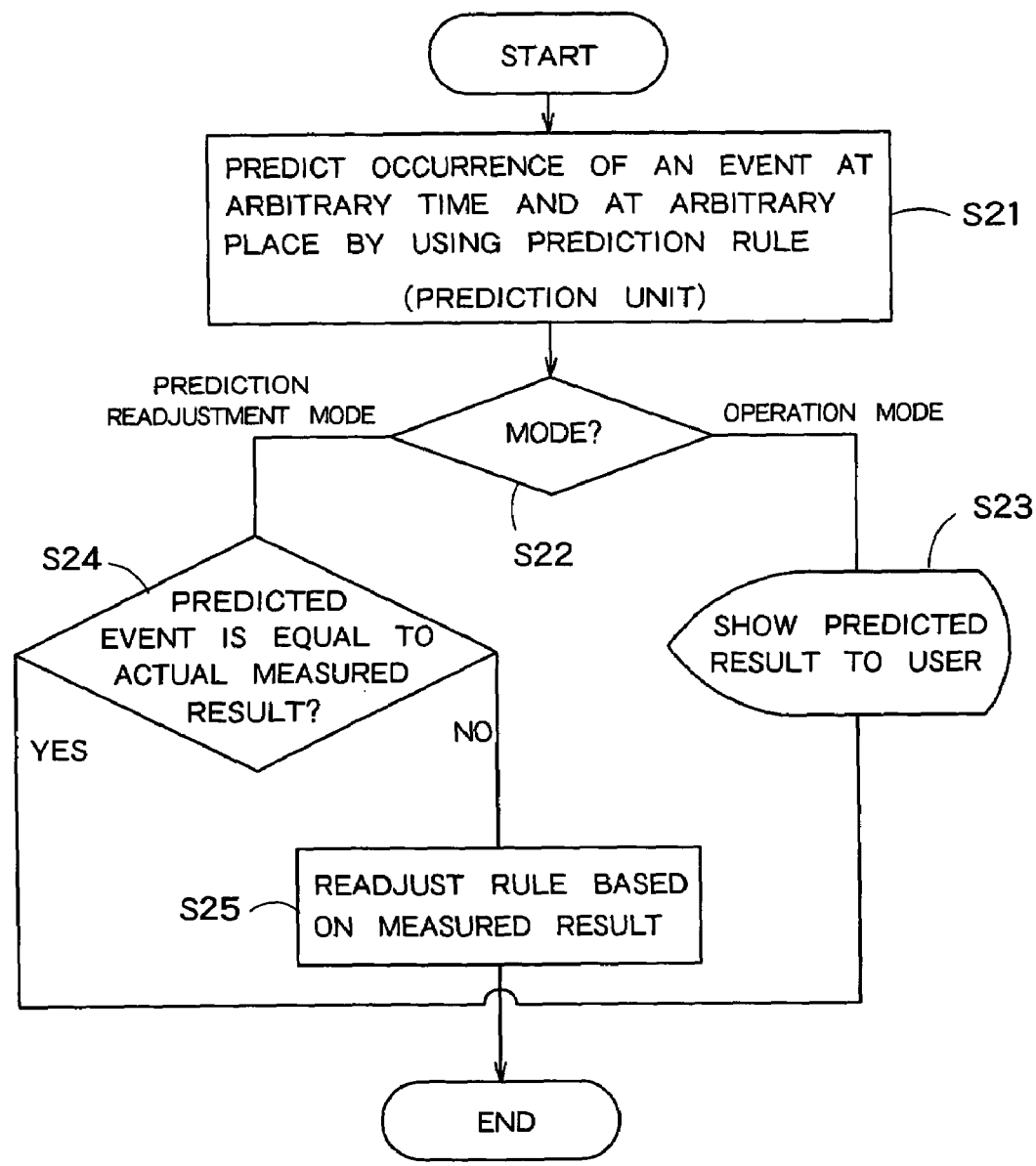
FIG. 21 is a flowchart showing processing procedure according to second embodiment of data analyzing apparatus of the present invention.

FIG. 21 is a flow chart showing a procedure of the second embodiment of the data analyzing apparatus according to the present invention. With the same processes as in steps S1 to S4 in FIG. 11, a tendency of occurrence of a predetermined event is derived (step S21).

It is decided which mode is set between a tendency readjustment mode and an operation mode (step S22). In the operation mode, the tendency derived in step S21 is shown to a user in a display manner as shown in FIG. 7 (step S23). In this case, the safety drive navigation is performed.

On the other hand, in the tendency readjustment mode, it is decided whether the tendency derived at step S21 is equal to an actual measured tendency or not (step S24). When the tendencies are equal to each other, the process is ended. When the tendencies are not equal to each other, the if-then rules are deleted to readjust the tendency (step S25).

In this manner, in the third embodiment, a tendency of occurrence of an event is readjusted as needed. Even though an occurrence state of the event changes, the tendency of occurrence can be accurately detected.

(Fourth Embodiment)

In the fourth embodiment, a location where an accident occurred in past, the time of occurrence of the accident, the extent of damage of the accident, and a traffic volume at the location are used as event data to analyze a tendency of occurrence of the accident.

The fourth embodiment of the data analyzing apparatus has the same configuration as shown in FIG. 1. In the event data storage unit 2, information including a location where an accident occurred in past, the time of occurrence of the accident, the extent of damage of the accident, and a traffic volume at the location is stored.

By using if-then rules obtained by the data analyzing unit 4, locations where a similar accident is likely to occur can be predicted. In addition, a frequency of occurrence of accidents can be measured on the basis of the data of the traffic volume. For this reason, the likelihood of occurrence of an accident at a location where an accident is expected can be digitized. On the basis of the location where an accident is expected, the probability of occurrence, and the extent of damage when the accident occurs, an expectation value of damage can be calculated.

For example, traveling through a route indicated by the route A-C-D-B in FIG. 16 is discussed. An event occurrence evaluation unit searches the following facts. That is, a driver travels through dangerous zones at the two points of C and D, the probabilities of occurrence of accidents at the points C and D are given by $Pc$ and $Pd$, respectively, and the extents of damage suffered when accidents occurs at the point C and D are given by $Dc$ and $Dd$, respectively. An estimation of damage of the route A-C-D-B can be evaluated by an expression $Dc \times Pc + Dd \times Pd$.

In this manner, in the fourth embodiment, a location where an accident has occurred, the time of occurrence of the accident, the extent of damage of the accident, and a traffic volume at the location are acquired as event data. For this reason, an expectation value of damage by the accident can be calculated. Therefore, by analyzing the expectation value of damage, a tendency of occurrence of the accident can be accurately analyzed.

(Fifth Embodiment)

In the fifth embodiment, a dangerous state is detected on the basis of biological information. When a person comes into a dangerous state, she/he must feel the stress. The state of stress can be detected by measuring an amount of sweat and a skin temperature according to Japanese Patent No. 2759188 "Stress Measurement Apparatus". When the biological information is measured and monitored, a state in which a driver begins to feel stress while driving is detected. A location and time at which the driver begins to feel stress are recorded, so that occurrence of a dangerous state can be automatically recorded.

The fifth embodiment of the data analyzing apparatus has the same configuration as that in, e.g., FIG. 19. An event data input unit inputs biological information (health condition information) such as a pulse, a breathing rate, an amount of sweat, a blood sugar level, a blood pressure, and the like. The input biological information is stored in the event data storage unit 2.

An analysis monitoring unit detects a state in which a driver begins to feel stress on the basis of the biological information, and records a location and time at which the driver begins to stress. The data analyzing unit 4 checks the location and time recorded by the analysis monitoring unit, so that a location and time at which the driver feels stress can be recognized.

In this manner, in the fifth embodiment, on the basis of the biological information, a location and time at which a driver feels stress are recorded. For this reason, a location and time at which a dangerous event has occurred can be accurately detected.

(Other Embodiment)

Figure 22:
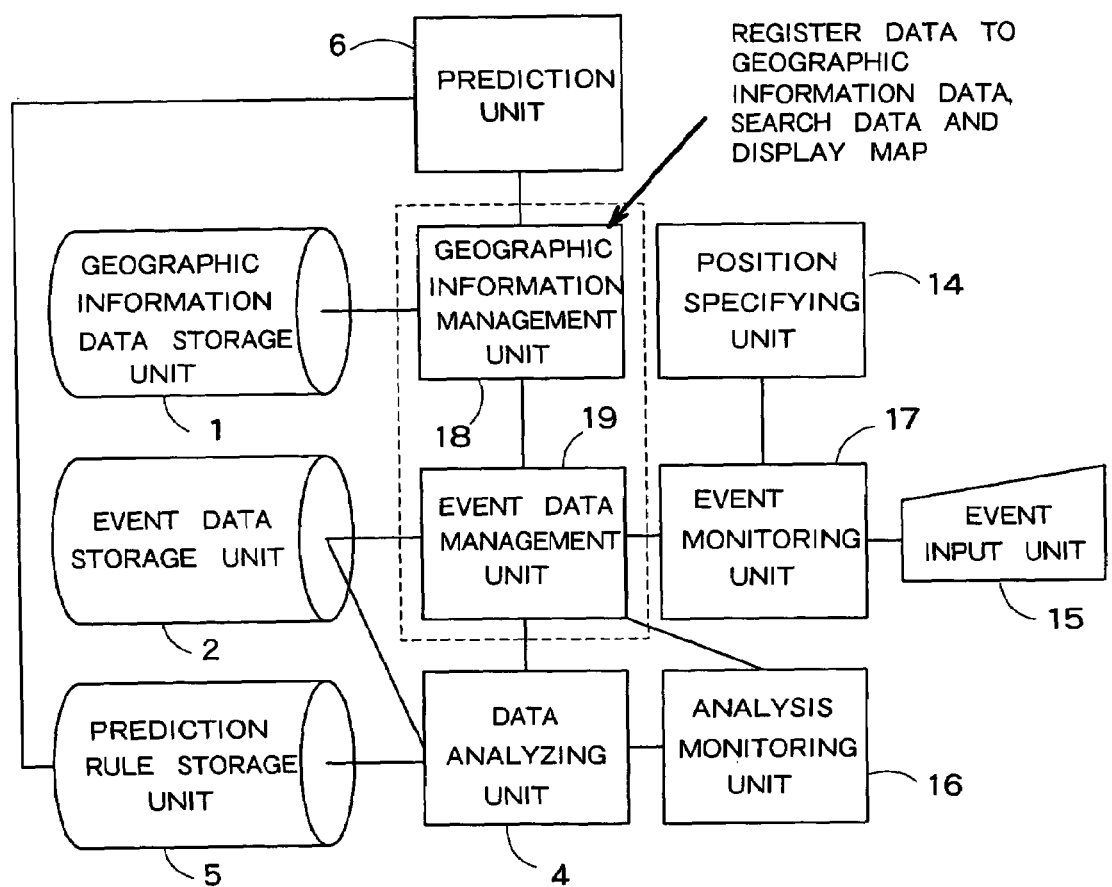
FIG. 22 is a block diagram showing detailed configuration of data analyzing unit.

The data analyzing unit 4 described in the above embodiments, more specifically, as shown in FIG. 22, has a geographic information management unit (GIS) 18 which manages geographic information to be stored in the geographic information data storage unit 1 and an event data management unit 19 which manages event data to be stored in the event data storage unit 2. The data analyzing unit 4 registers new geographic information in the geographic information data storage unit 1, searches the geographic information data storage unit 1, and displays the searched geographic information. The event data management unit 19 has functions of searching and registering geographic information.

The data analyzing apparatus described in the embodiments may be constituted by hardware or software. When the data analyzing apparatus is constituted by software, a program which realizes at least some functions of the data analyzing apparatus may be stored in a recording medium such as a floppy disk or a CD-ROM, loaded on the computer, and executed by the computer. The recording medium is not limited to a mobile recording medium such as a magnetic disk or an optical disk. A fixed recording medium such as a hard disk device or a memory may be used.

A program which realizes at least some functions of the data analyzing apparatus may be distributed through a communication network (including wireless communication) such as the Internet or the like. In addition, the program may be encrypted, modulated, or compressed and distributed through a cable network such as the Internet or the like, or a wireless network, or the program may be distributed such that the program is stored in a recording medium.

The data analyzing apparatus described in the above embodiments may be constituted by a base station and a mobile terminal separately. For example, analysis of data and accumulation of event data are performed on the base station side. Processes such as collection of event data, warning given when a driver comes close to a highly dangerous location, and safe route or the like are performed on the mobile terminal side. Communication between the base station and the mobile terminal is performed by using a cable/wireless public communication network. The base station transmits an analysis result to the mobile terminal. The mobile terminal receives the analysis result to give warning and to guide a safe route. The mobile terminal collects event data and transmits the event data to the base station. The base station receives and accumulates the event data and then analyses the event data.

Some of processes may be performed on the base station side depending on the processing power of the mobile terminal. For example, a route searching process in route guidance may be performed on the base station side, and the mobile terminal may show only a searching result.

What is claimed is:

1. A data analyzing apparatus, comprising:
    a first storage which stores geographic information;
    a second storage which stores observation data including contents of an event, a position where the event occurred and a time when the event occurred;
    a data processing unit configured to generate analyzing data by using the geographic information and the observation data;
    a data analyzing unit configured to derive a tendency of occurrence of the event based on the analyzing data;
    a prediction unit configured to predict a place where the tendency of occurrence of the event is high by using the tendency and the geographic information;
    an observation data input unit configured to input new observation data;
    an analyzing monitor unit configured to control said data processing unit to generate modified analyzing data by using the new observation data, the observation data and the geographic information, and to readjust the analyzed result based on the modified analyzing data; and
    a health condition observer which observes a health condition data including at least one of a heart beat, a breathing rate, an amount of sweat, a blood sugar level and a blood pressure,
    wherein said observation data input unit inputs the observation data including the health condition data.

2. A computer readable medium having a program stored thereon which allows a computer to analyze data, by performing steps comprising:
    generating analyzing data by using observation data including contents of an event, a position where the event occurred and a time when the event occurred, and health condition information including at least one of pulse, a breathing rate, an amount of sweat, a blood sugar level and a blood pressure and geographic information;
    deriving a tendency of occurrence of the event based on the analyzing data;
    predicting a place where the tendency of occurrence of the event is high by using the tendency and the geographic information;
    inputting new observation data; and
    controlling said data processing unit to generate modified analyzing data by using the new observation data, the observation data and the geographic information, and to readjust the analyzed result based on the modified analyzing data and store the readjusted analyzed result in a medium,
    detecting health condition information including at least one of pulse, a breathing rate, an amount of sweat, a blood sugar level and a blood pressure,
    wherein said observation data input unit inputs the observation data including information of the health condition.

* * * * *